United States Patent
Frame et al.

(10) Patent No.: US 6,951,265 B2
(45) Date of Patent: Oct. 4, 2005

(54) FOLDABLE STAIRWAY LADDER

(75) Inventors: William F. Frame, Hochessin (DE); Gerald E. Kuehl, Collegeville, PA (US)

(73) Assignee: Ballymore Company, Inc., West Chester, PA (US)

( * ) Notice: Subject to any disclaimer, the term of this patent is extended or adjusted under 35 U.S.C. 154(b) by 0 days.

(21) Appl. No.: 10/633,951

(22) Filed: Aug. 4, 2003

(65) Prior Publication Data

US 2005/0029048 A1 Feb. 10, 2005

(51) Int. Cl.[7] .................................. E04G 1/34
(52) U.S. Cl. ...................... 182/152; 182/156; 182/127; 280/47.16
(58) Field of Search .............................. 182/152, 127, 182/156, 15, 17, 25, 27, 161, 172, 200, 165, 173; 280/47.16

(56) References Cited

U.S. PATENT DOCUMENTS

| | | | | |
|---|---|---|---|---|
| 826,582 A | * | 7/1906 | Laird | 182/124 |
| 1,439,388 A | * | 12/1922 | Willett | 182/15 |
| 1,832,537 A | * | 11/1931 | Erwin | 182/152 |
| 2,369,743 A | * | 2/1945 | Langdon | 182/125 |
| 4,044,857 A | * | 8/1977 | Guerette | 182/17 |
| 4,194,591 A | * | 3/1980 | Fisher | 182/17 |
| 5,411,111 A | * | 5/1995 | Greve | 182/17 |
| 5,791,434 A | * | 8/1998 | Swiderski | 182/17 |
| 6,189,653 B1 | * | 2/2001 | Laug | 182/152 |
| 6,283,249 B1 | * | 9/2001 | Young et al. | 182/17 |
| 6,305,496 B1 | * | 10/2001 | Bieszczad | 182/15 |
| 6,386,320 B1 | * | 5/2002 | Clavel | 182/165 |
| 6,523,640 B1 | * | 2/2003 | Young et al. | 182/17 |

* cited by examiner

Primary Examiner—Bruce A. Lev
(74) Attorney, Agent, or Firm—Stuart D. Rudoler, Esq.

(57) ABSTRACT

A foldable stairway ladder for use in accessing items includes a structure that can be conveniently folded to reduce the amount of space taken up by ladder when not in use. The ladder consists of a stairway section connected to a platform, in turn rotatably connected to a support. The foldable ladder is also provided with a manually operable folding system adapted to fold the stairway section and support relative to each other. Additionally, the support may have a member capable of extending the length of the support, thus facilitating the ease by which a use can fold the stairway ladder.

24 Claims, 5 Drawing Sheets

FOLDABLE STAIRWAY LADDER

FIELD OF THE INVENTION

This invention relates to stairway ladders.

BACKGROUND OF THE INVENTION

Stairway ladders generally include a series of stairs or treads arranged in a sloped relation to each other so that a user may ascend from ground level to a higher level or descend therefrom. Stairway ladders often are configured to have a generally level platform at the top level. The stairs are arranged in any of a variety of slopes extending from the bottom front of the stairs to the platform. The platform is generally supported by the stairs at the front end and additionally supported at the back end, where the additional support is generally vertical in nature. This configuration allows for the platform and back end of the ladder to be placed flush or close to an area of interest above ground level, so that a user can access such area of interest.

Stairway ladders are used in any number of environments, including those where goods, supplies, crates, cartons, or any other items are stored, stocked, transferred to and from, or placed at locations otherwise out of reach of persons desiring access to them. Thus, stairway ladders find use in any of a variety of environments, ranging from large industrial warehouses, distribution centers, and large retail warehouses, to smaller stock rooms, store rooms and other back rooms. Stairway ladders are likewise finding use outside of stock rooms in the consumer or retail areas of commercial establishments. For example, use by retail store personnel or consumers to retrieve items placed on high shelving along store aisles is common.

Stairway ladders generally are not foldable, and thus may obstruct aisles or otherwise be in the way when not in use. Those stairway ladders which can be folded suffer from various drawbacks and disadvantages. For example, the folding systems of such stairway ladders are generally not manually operable or foldable, meaning that a user generally must use tools to take apart certain structures of the ladder in order to fold it. This is burdensome for a user for a variety of reasons. For example, it is difficult to take apart the structure quickly, especially if the user is either not accustomed to using tools, or does not have the strength to handle the individual parts of the stairway ladder. The folding operation associated with current stairway ladders is sometimes not ideal, and may place physical demands on the user that would be preferable to avoid. Still further, the disassembly and reassembly time may be considerable depending on the proficiency of the person handling the foldable stairway ladder. Moreover, space within an aisle in a retail setting may be insufficient to allow a user to breakdown the stairway ladder easily, if at all.

Thus, there is a need for stairway ladders to be easy to use in a variety of environments, including, but not limited to, retail environments, while at the same time maintaining acceptable levels of safety and compliance with any applicable industry standard.

SUMMARY OF THE INVENTION

According to one aspect of the invention, the ladder for use in accessing items comprises a stairway section adapted for a user to go up or down and a support secured to the stairway section to retain the stairway section at a desired slope, where the stairway section takes up an amount of space. The ladder is provided with a manually operable folding system adapted to reduce the amount of space taken up by the ladder when not in use.

Preferably, the folding system comprises an actuable mechanism adapted to fold the support and the stairway section relative to each other to reduce the amount of space in the horizontal direction taken up by the ladder when not in use. The mechanism may be comprised of a hinge located and connected between the support and stairway section. The hinge may be comprised of a pair of spreaders extending between corresponding sides of the stairway section and the support. The folding system may include a docking device adapted to be secured in operative proximity to the support of the ladder, the device configured to receive a corresponding section of the support therein to secure the ladder in a substantially upright position when the support and the stairway section are folded relative to each other. Additionally, the support may have at least one member movably secured thereto and capable of extending the length of support, where the stairway section and support have respective lengths.

In accordance with another aspect of the invention, the ladder further comprises at least one handrail secured to the stairway section at a location to be grasped by the user while going up or down. Additionally, the handrail my be moved between a first, deployed position locating the handrail at a predetermined height above the stairway section, and a second, collapsed position locating the handrail at a height below the predetermined height, so that the handrail occupies less space above the stairway section when in the second position.

Yet another aspect of the invention is a method of increasing space around a stairway ladder when not in use by deploying a stairway section and support relative to the stairway section to hold the stairway section at a desired angle when the ladder is in use. The method can involve folding the ladder by unlocking a hinge extending between the support and the stairway section, and rotating the stairway section and the support relative to each other to reduce the angles between them. The stairway ladder that has been folded is in a vertically upright position.

Another aspect of the method involves further securing the folded stairway ladder in a substantially vertical position.

BRIEF DESCRIPTIONS OF THE DRAWINGS

In the drawings, which are discussed below, one or more of the preferred embodiments are illustrated, with the same reference numerals referring to the same pieces of the invention throughout the drawings. It is understood that the invention is not limited to the preferred embodiments depicted in the drawings herein, but rather it is defined by the claims appended hereto and equivalent structures.

DETAILED DESCRIPTION OF THE PREFERRED EMBODIMENT

While the specification concludes with claims particularly pointing out and distinctly claiming the subject matter which is regarded as the invention, the invention will now be further described by reference to the following detailed description of preferred embodiments taken in conjunction with the above-described accompanying drawings.

Figure 1:
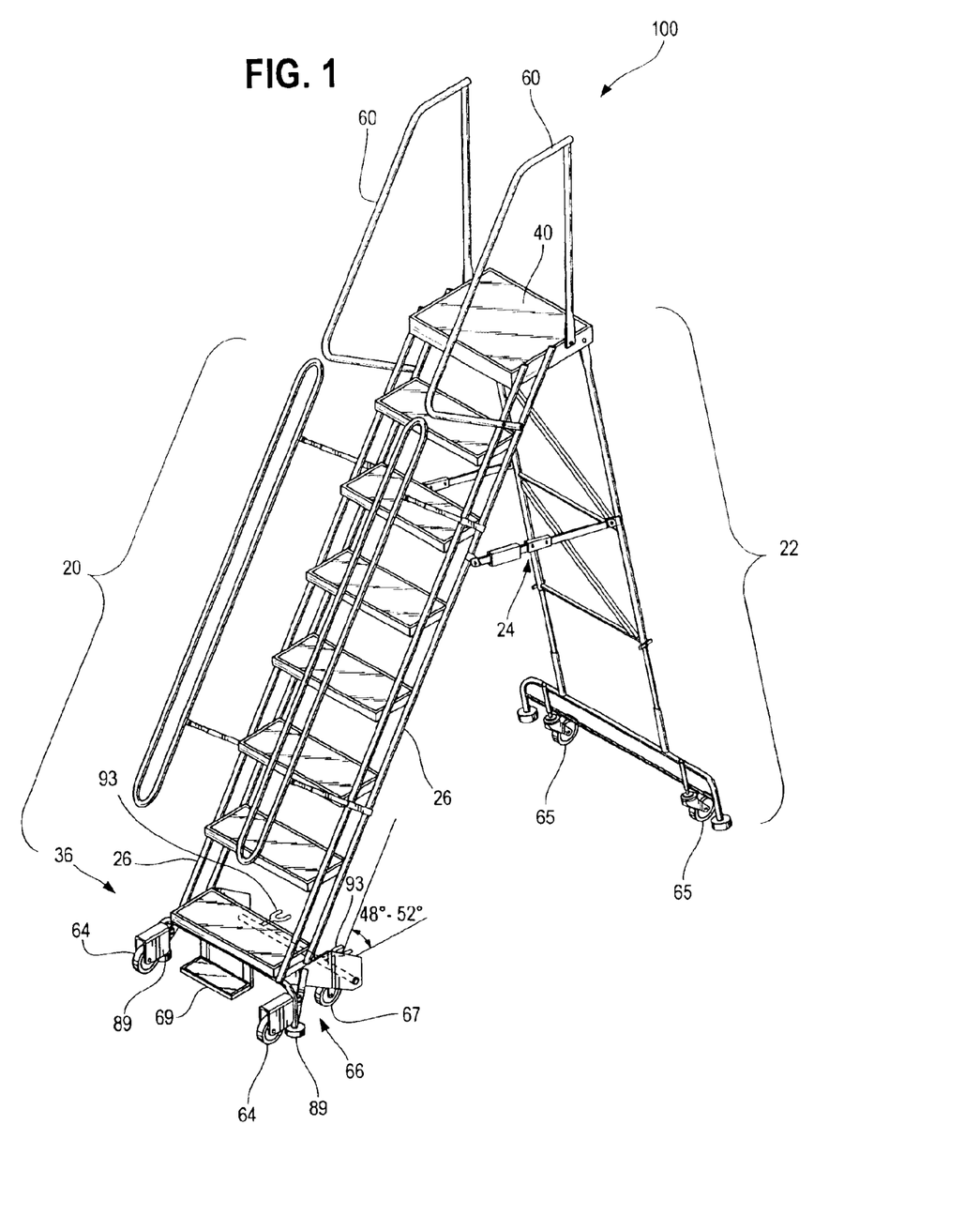
FIG. 1 is a perspective view of one preferred embodiment of the ladder according to the present invention, in an open-frame and operative position.
Figure 2:
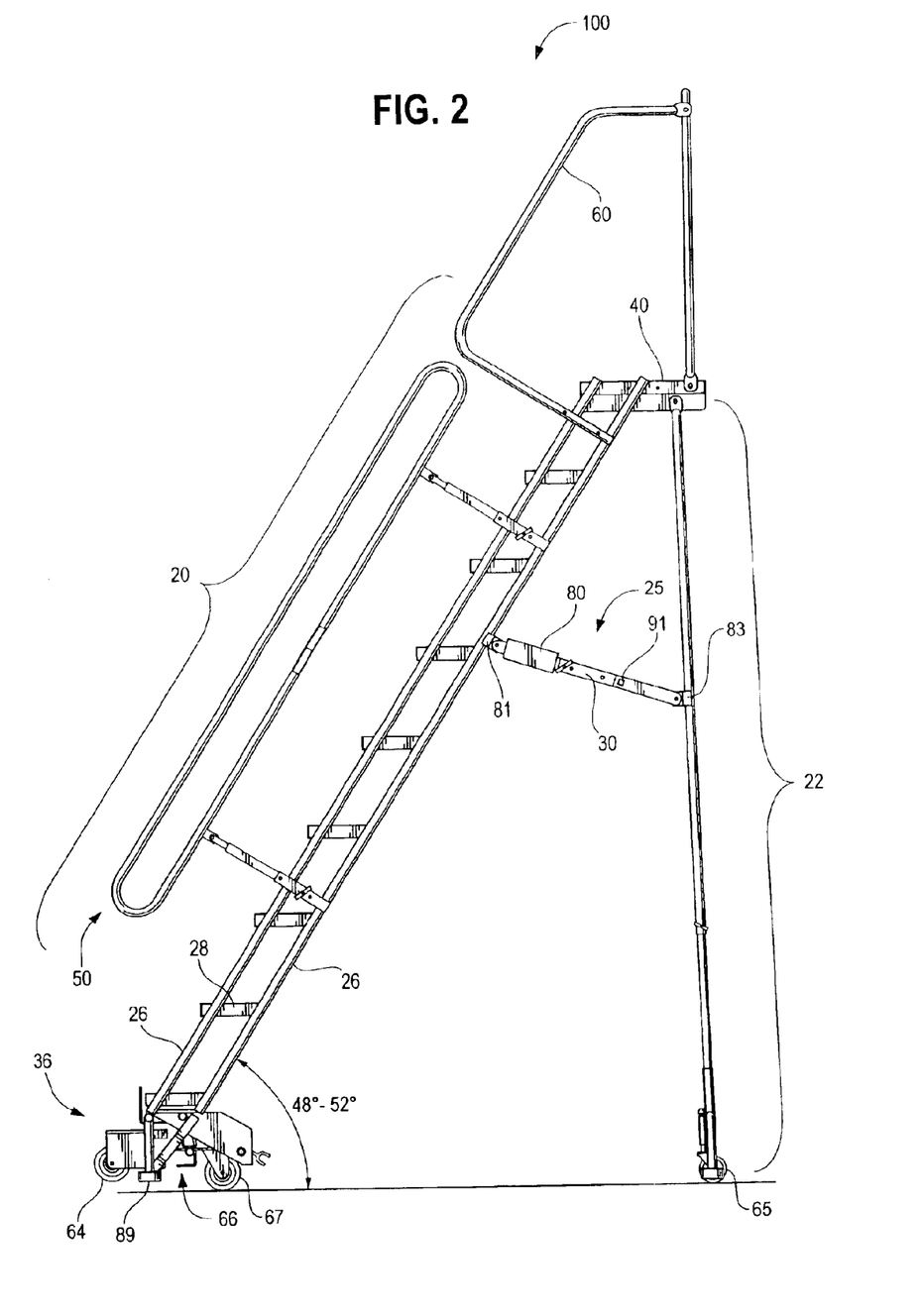
FIG. 2 is a side elevational view of the ladder of FIG. 1.

Referring to FIGS. 1 and 2, the foldable stairway ladder 100 is formed generally of four components interconnected to each other at selected points to create the necessary structure: a stairway section 20, a platform 40, a support 22, and a folding system 24. According to one of the preferred embodiments of the present invention, the ladder 100 has the stairway section 20 connected to the platform 40 at one end of the platform 40, with the support 22 connected to the platform 40 at another end of the platform 40.

When the ladder 100 is fully deployed in its open-frame and operative position shown in FIGS. 1 and 2, support 22 is in a substantially vertical position and supports the platform 40 and stairway section 20. The support 22 secures the stairway section 20 at a desired slope with respect to horizontal, in the open-frame position, where both the support 22 and stairway section 20 take up a predetermined amount of space.

Figure 4:
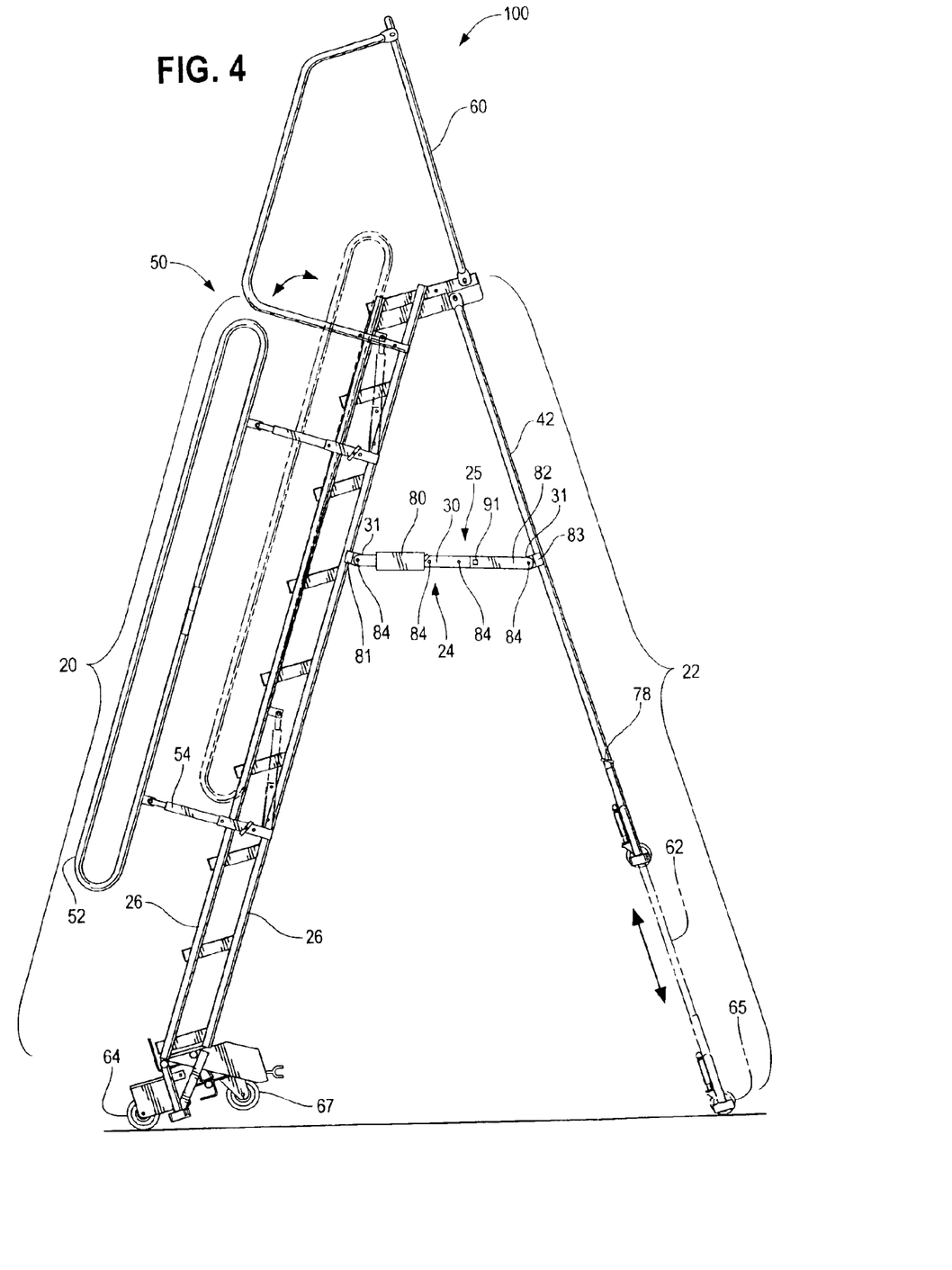
FIGS. 4 and 5 are side elevational views of the ladder showing various possible manipulations of the components thereof.
Figure 5:
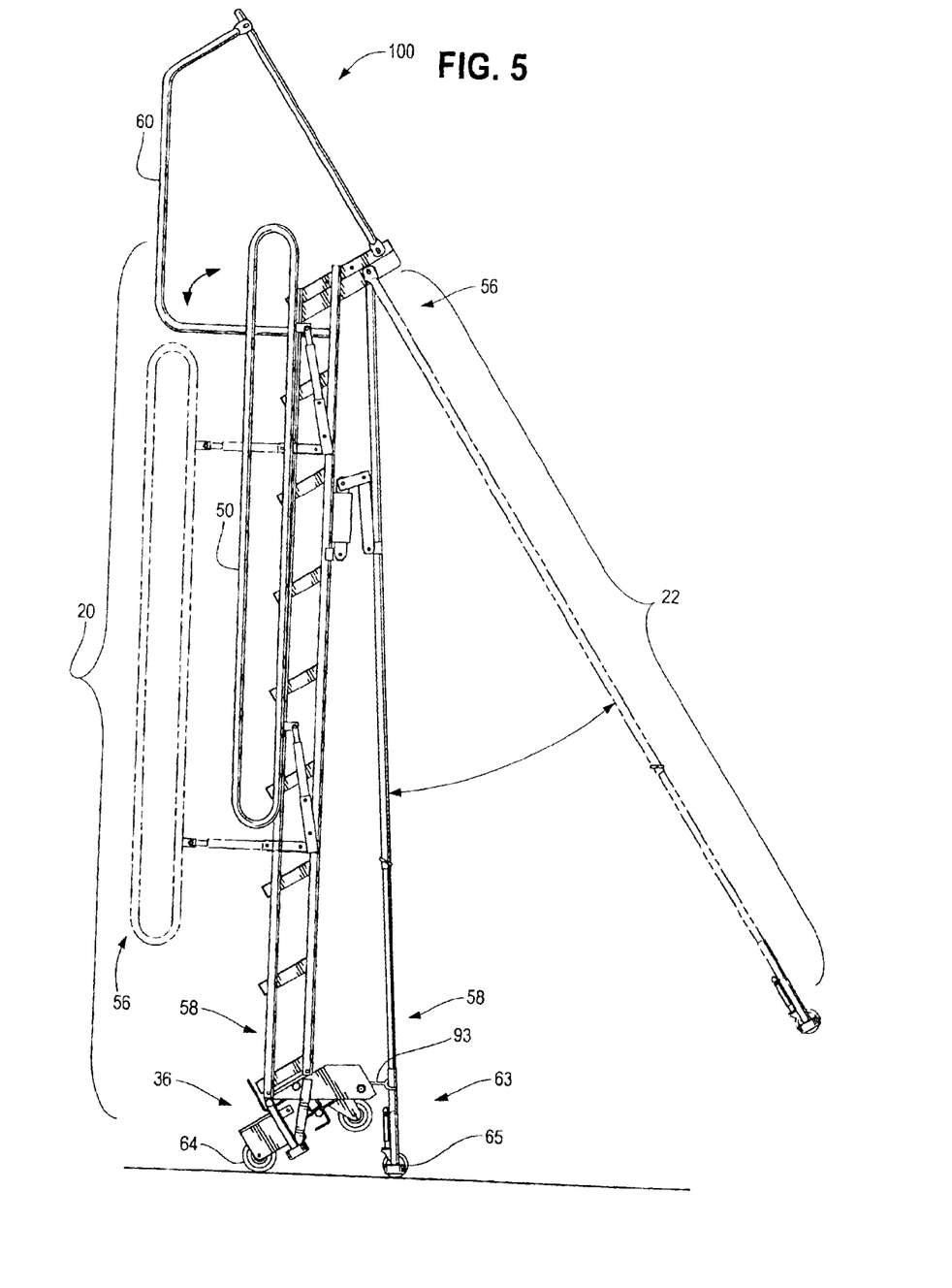

The folding system 24 of ladder 100 is adapted to reduce the amount of such space taken up by the ladder 100. As shown in FIGS. 4 and 5, the folding system 24 is preferably comprised of a pair of spreaders or hinges 25, with opposite ends operatively connected to corresponding sides of the support 22 and stairway section 20. The pair of spreaders or hinges 25 thus creates a mechanism to fold the stairway section 20 and the support 22 relative to each other. Each of the spreaders or hinges 25 is comprised of at least two, and preferably three components rotatably interconnected to accomplish the desired folding. In the preferred embodiment, spreaders 25 are rotatably secured to stairway section 20 by corresponding plates 81 secured to the stairway section 20, such that the pair of plates extend toward the support 22. In a like manner, spreaders 25 are rotatably secured to support 22 by corresponding plates 83 secured to the support 22, such that the pair of plates extend toward the stairway section 20. The pairs of plates 81, 83 are located approximately in the middle along the length of the stairway section 20 and the support 22, respectively, resulting in the spreaders being at a medial location as well. The folding system 24 is preferably manually operable to reduce the amount of space taken up by the ladder 100.

The rotatable, interconnected components of spreader 25 are now described for one of the spreaders 25, the other spreader being a mirror image thereof. Arms 82 are rotatably secured at their outer ends 31 to a corresponding one of plate, preferably through axially aligned holes (not shown) which can be aligned in corresponding holes 84 of arms 82. A securing device rotatably connects each of the plates to its corresponding arm 82. The arms 82 converge and connect to opposite ends of an actuable mechanism or bridge 30. Each arm 82 is rotatably connected by a suitable securing or fastening device to the actuable mechanism 30 through axially aligned holes corresponding with holes on both ends of the actuable mechanism 30.

The folding system 24 is also comprised of a locking device 80 that holds its corresponding spreader 25 in the fully open position and secures the support 22 relative to stairway section 20 in its guard against inadvertently folding or closing the spreader 25. This also secures the support 22 relative to the stairway section 20 in its open position. Thus, the ladder 100 has both an open-frame position suitable for operation (FIGS. 1 and 2) and a folded position suitable for storing (FIG. 5). Preferably, the locking device 80 is a metallic sheath capable of sliding along the length of the spreader 25, but is prevented from sliding along the entire length by a stop 91. The stop 91 is located on the spreader 25 such that when the locking device 80 is resting against the stop 91, the locking device 80 prevents spreader 25 from hinging. By virtue of the sheath being greater in length compared to the actuable mechanism 30 and encasing the actuable mechanism 30 entirely, the arms 82 are prevented from rotating or hinging relative to the actuable mechanism 30. However, while the preferred embodiment of the locking device 80 is a sheath capable of sliding, the locking device 80 may be any device that prevents the spreader 25 from hinging, including, but not limited to, a releasable locking pin.

The stairway section 20 is comprised of a bottom section 36, shown best in FIGS. 1 and 2, connected to longitudinal sides 26, the longitudinal sides 26 having a plurality of steps 28 disposed therebetween.

To increase the stability of the bottom section 36, and to prevent the foldable stairway ladder 100 from unintentionally rolling, the bottom section 36 is also comprised of a stopping mechanism 66, such as a LOCKSTEP device. In its form as a LOCKSTEP device, the stopping mechanism 66 includes two casters 67 connected to the lower end of the stairway section 20 so as to be moveable relative to the floor or horizontal surface on which the stairway section 20 is placed. The casters 67 engage and disengage the ground through use of a pedal 69 in a manner known in the industry such that when the stairway casters disengage the ground, the stairway section 20 is supported by stairway legs 89. Additionally, another pair of casters 64 is connected to the front of the bottom section for use in rolling the ladder in the folded position, as discussed subsequently. Casters 64 are raised relative to the ground so they do not engage the surface when the ladder is in the open-frame position.

Additionally, standoffs 93 are connected to the bottom section 36 such that when the ladder 100 is in the folded position, the members of the support 22 rest against the standoffs 93. The standoffs 93 keep the support 22 at an acceptable minimum distance from the stairway section 20 to maintain the stability of the ladder 100 when upright in the folded position. Thus, the ladder 100 may stand alone or be moved where the risk of the ladder 100 toppling or falling over is greatly reduced.

As best shown in FIG. 2, the longitudinal sides 26 are connected to the bottom section 36 at one end and are secured to the platform 40 at the other. The longitudinal sides 26 are secured to the platform 40 at an angle, the angle preferably ranging from about 48 degrees to about 60 degrees with respect to the horizontal surface, when the ladder 100 is in the open-frame position. This slope generally allows for improved ergonomics for the users, which includes a more secure sense of balance when handling loads or otherwise conducting operations in connection with the ladder 100. In use, a user is able to stand on and ascend and descend the stairway section with heavy loads without having to lean forward or backward to maintain his or her balance. Each longitudinal side 26 is preferably comprised of two tubular members.

There are eight steps 28 that are equally spaced vertically along the longitudinal sides 26. The plurality of steps 28 are secured so as to be in a substantially level position with respect to the horizontal surface when the foldable stairway ladder is in the open-frame position. To increase safety, the steps 28 of the stairway section 20 optionally have materials that provide texture and increase their frictional coefficient, thus reducing risks of a user slipping. For example, an abrasive mat can be placed on the top surface of the steps, or the top surface of the steps can incorporate treads or be rough so that the surface of the steps is textured.

Figure 3:
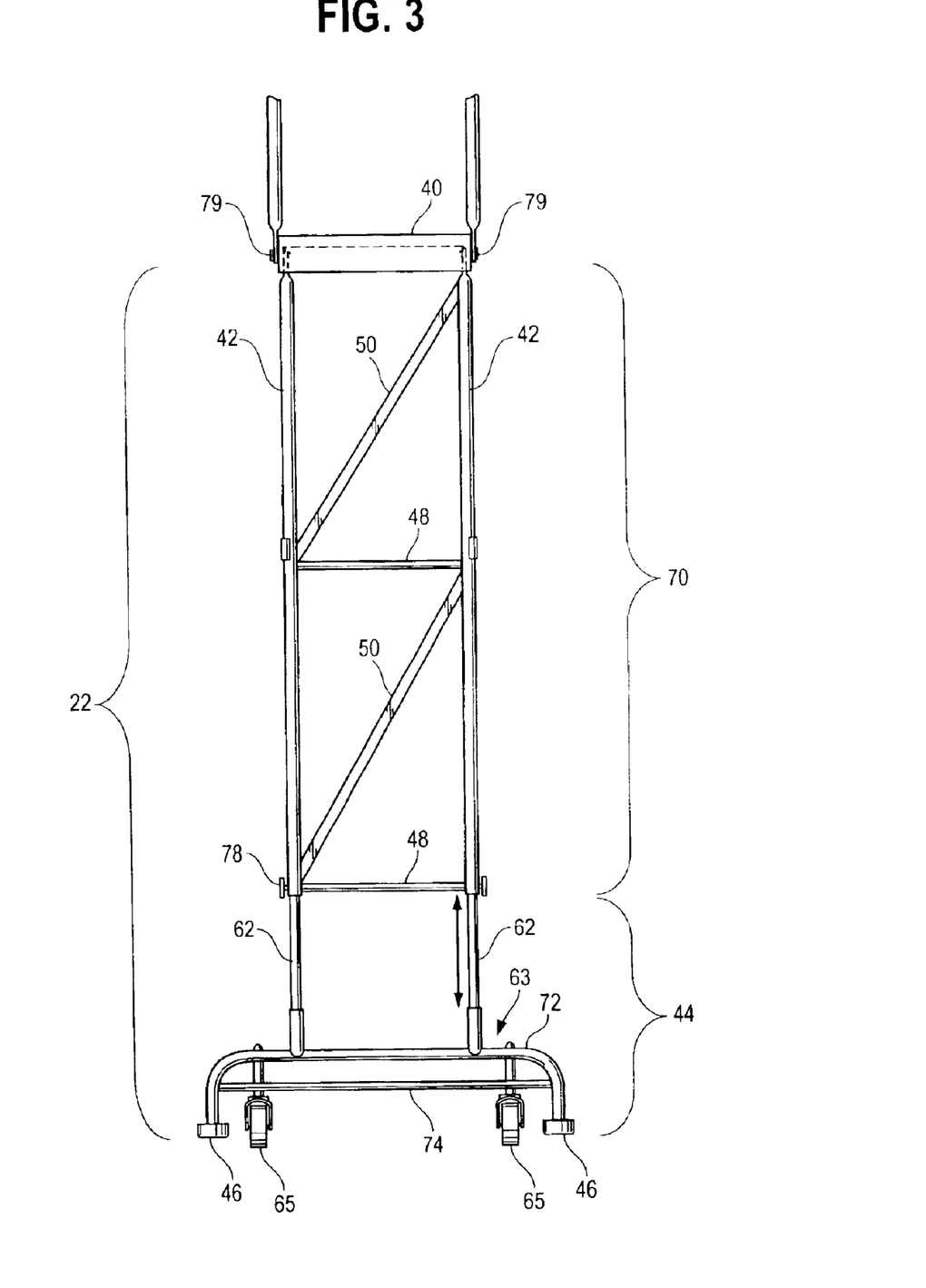
FIG. 3 is a rear elevational view of the ladder of FIGS. 1 and 2.

As shown in FIG. 3, support 22 is in an approximately vertical position when ladder 100 is open. Support 22 is preferably of frame construction to supply the required strength and rigidity, while reducing material costs and weight. Any number of configurations of frame members are suitable for creating support 22. The support 22 is preferably comprised of an upper section 70 and a lower section 44. Support 22 is rotatably connected relative to stairway section 20. In this embodiment, upper section 70 has an upper end secured to the lateral sides of the platform 40. Lower section 44 is secured to upper section 70 so as to be able to extend or reduce the overall length of support 22. Preferably, the upper section 70 has a pair of members 42 stored and located to telescopically receive a pair of corresponding members 62 of the lower section 44. The members 42 are long enough to receive at least a portion of respective members 62 therein. The lower section has members 62 secured to a base 63, where the base 63 is adapted to engage a substantially horizontal surface.

The upper section 70 of support 22 is preferably comprised of a pair of members 42 rotatably connected to the platform 40, one or more interconnected horizontal members 48, and one or more interconnected diagonal members 50. The members 42, 48, 50 are preferably elongated and formed as hollow tubes of any suitable cross-section, as bar metal, or in any other suitable configuration for elongated members. The preferred embodiment uses tubular members. In a known manner, certain ends of the members 42 are shaped to become flatter toward the ends to be connected to the platform 40. As shown in FIG. 3, fasteners 79 connect the sides of the platform 40 with the members 42 along axially aligned holes (not shown), respectively. Thus, the flattened section of the members 42 may easily rotate with respect to the platform 40.

As shown in FIGS. 3–4, the members 62 are telescopically connected to the upper section 70, and in particular, to the members 42. Preferably, the support 22 incorporates a suitable mechanism, such as springs located within the members 42, which facilitates the ease by which a user can extend and reduce the overall length of support 22. Members 42, 62 are equipped with mating, axially aligned holes such that a releasable locking device 78 can secure the members 42 and the members 62 relative to each other, in both an extended position and non-extended position, preventing inadvertent sliding of the members.

Moreover, as shown in FIG. 4, the support 22 is approximately equal in length to the stairway section 20 when the members 62 are in the fully extended position. However, when the members 62 are not extended, the support 22 has a length shorter than that of the stairway section 20, which holds stairway section 20 at the appropriate slope.

Referring back to FIG. 3, the base 63 of the lower section 44 is comprised of an inverted "U" shaped bar 72 having ends connected to feet 46. The feet 46 may be comprised of rubber or any material suitable for gripping a surface. The inverted "U" shaped bar 72 is connected to the second members 62 in a manner where the feet 46 are capable of engaging the horizontal surface.

The lower section 44 is further comprised of casters 65 located between the ends of the "U" shaped bar and connected to the inverted "U" shaped bar 72. Preferably, the casters 65 are 4 inches in diameter. It will be appreciated that casters 65 are selected to keep feet 46 off of the horizontal surface while no person or load is on ladder 100, so that ladder 100 can be rolled. Conversely, when a person or sufficient load is placed on ladder 100, casters 65 are compressed and feet 46 engage the ground Preferably, a pair of handrails 50 are secured to respective longitudinal sides 26 of the stairway section 20. Each handrail 50 includes a rail 52 of a substantially oval design, and a pair of arms 54, each having one end rotatably connected to rail 52 and the other end rotatably connected to the stairway section 20. The handrails 50 may be moved between at least two positions: a first, open or deployed position, and a second, folded or closed position.

In their open or deployed position, handrails 50 are located a predetermined height above the stairway section 20 to enable a user to grasp them as needed. When the handrails 50 are in the folded position, handrails 50 are located below the height of their deployed position. Thus, in the second, folded position, the handrails 50 occupy less space above the stairway section 20. The handrails 50 can be rendered foldable by any suitable means including, but not limited to, hinges or locking pins.

When locking pins or a locking mechanism is used, the arms 54 may be locked in a predetermined position, such as when the ladder is in the deployed or collapsed position.

Ladder 100 may be further comprised of at least one handrail 60 substantially located above the platform 40, whereby a user grasping the second handrail 60 on or near the platform 40 has added stability and balance. One end of the second handrail 60 is connected to the longitudinal sides 26 of the stairway section 20 and the other end is connected to the platform 40. Optionally, the second handrail 60 is removable.

Preferably, the stairway section 20 and second handrail 60 are formed substantially of aluminum, and the members 42 and the actuable mechanism 30 are formed substantially of steel. Alternatively, the foldable stairway ladder 100 may be made of wood, aluminum, steel, or any material with suitable strength and related characteristics for its intended purposes.

The above-described features of ladder 100 allow it to be folded or collapsed in a number of different ways to increase the space around ladder 100 when not in use. As previously mentioned, when the ladder 100 is in its open position, the support 22 is deployed or separated at an angle relative to the stairway section 20. As such, support 22 holds the stairway section 20 at a desired slope when the foldable stairway ladder 100 is in use.

The support 22 and the stairway section 20 are rotatable relative to each other. The handrails 50 are likewise movable from a deployed position above the stairway section to a folded or collapsed position which is lower and thus closer to the stairway section. As such, one or more of these structures can be folded, collapsed, or otherwise moved relative to the other structures of the ladder, so that the ladder becomes more compact, i.e., takes up less space.

The amount of folding or collapsing can, of course, be determined by the user, depending on particular needs and the space constraints, if any, in which the ladder is being used.

One suitable method for folding or collapsing the ladder 100 to increase space around it is now described. A user extends out the members 62 (of the lower section 44) from the members 42 (of the upper section 70) and locks the members 62 relative to the members 42 so that the members 62 are not capable of inadvertently sliding back to the non-extended position. As a result, the support 22 and stairway section 20 become substantially equal in length. A user then unlocks each of the releasable locking devices 80 securing the corresponding spreaders 25 and their actuable mechanisms 30 and arms 82, which extend between the support 22 and the stairway section 20. Then the user "breaks" a suitable number of the hinged connections of spreaders 25 so that the actuable mechanism 30 and arms 82 fold relative to each other.

The user is then free to rotate the stairway section 20 and the support 22 relative to each other to reduce the angle therebetween. By virtue of having the members 62 in the extended position, a user can fold the stairway section 20 and the support 22 relative to each other with ease. For example, a user can advance the stairway section 20 toward support 22 to transform the ladder 100 from its first position 56 (FIGS. 1 and 2) to its second position 58 (FIG. 5).

Optionally, the user can move the handrails 50 from their first position 56 at a predetermined height above the stairway section (FIG. 4) to their second position 58 at a height below that of the first position (FIG. 5). The method of folding the ladder optionally includes securing the folded ladder in a substantially vertical position by a holding device such as, but not limited to, straps with securable ends.

The use and operation of the ladder 100 is apparent from the above description. When a user wants to place or retrieve items or objects from shelving or another area of interest that is inaccessible from ground level, or when a user wants to perform certain activities above ground level, he or she may roll the ladder 100 to the area of interest. The user then generally places the platform 40 and support 22 flush or close to the shelf or area of interest. The user ascends the stairway section 20 by the required amount, including ascending to the platform 40, if needed, performs the desired activity, and then descends the stairway section 20.

Once the foldable stairway ladder 100 is no longer needed, it can be conveniently stored by making it more compact by performing one or more of the folding steps described previously. In the preferred embodiment, the stairway section 20 is about 141 inches long and 18 inches wide. The support 22 is about 88 inches long when in the non-extended position, increasing in length to about 100 inches in the extended position. Additionally, the handrails 50 are 63 inches in length and 6 inches in height. Moreover, the pair of arms 54 connected between each handrail 50 and the stairway section 20 are about 18 inches in length.

Among the various advantages apparent from the foregoing description, a user does not have to unscrew, disassemble, or take apart the foldable stairway ladder 100 in order to fold it up. Additionally, the foldable stairway ladder 100 is stable in the upright position such that the ladder 100 may stand alone and/or be moved with relative ease and safety.

As a further advantage, the described foldable stairway ladder 100 allows for an efficient and convenient way of reducing the space taken up by a stairway ladder in a number of settings, including a retail setting where users are restricted in space, time, and possibly physical limitation.

The present invention may be embodied in other specific forms without departing from the spirit or essential attributes thereof and, accordingly, reference should be made to the appended claims, rather than to the foregoing specification, as indicating the scope of the invention.

What is claimed is:

1. A foldable rolling stairway ladder for use in accessing items, the foldable stairway ladder comprising:
   (a) a stairway section adapted for a user to ascend or descend with casters on the lower end;
   (b) a platform secured to the stairway section to retain the stairway section at a predetermined slope;
   (c) a support of adjustable length rotatably connected to the platform; and
   (d) a manually actuable folding system adapted to reduce the amount of space taken up by the foldable stairway ladder;
   wherein the stairway can stand upright in both the folded and unfolded positions.

2. The foldable stairway ladder of claim 1, wherein the folding system comprises a mechanism adapted to fold the support and the stairway section relative to each other.

3. The foldable stairway ladder of claim 2, wherein the mechanism comprises a hinge located between, and connected to, the support and the stairway section.

4. The foldable stairway ladder of claim 3, wherein the hinge comprises a pair of spreaders extending between corresponding sides of the stairway section and the support.

5. The foldable stairway ladder of claim 1, further comprising at least one handrail movably secured to the stairway section at a location where a user can grasp the handrail while ascending or descending the stairway section.

6. The foldable stairway ladder of claim 5, wherein the handrail is capable of moving between at least two positions.

7. The foldable stairway ladder of claim 6, wherein the two positions comprise a first, deployed position locating the handrail at a predetermined height above the stairway section, and a second, collapsed position locating the handrail at a height below the predetermined height, so that the handrail occupies less space above the stairway section when in the second position.

8. The foldable stairway ladder of claim 1, wherein the support can be adjusted to be approximately the same length as the stairway section.

9. The foldable stairway ladder of claim 1, wherein the casters are spring-loaded.

10. The folding system of claim 1, wherein the folding system substantially comprises mechanical components.

11. The foldable stairway of claim 1 wherein the casters are wheels, rollers or balls.

12. A foldable rolling stairway ladder comprising:
   (a) a stairway section having a bottom section accessible to a user, a top section at a height above the bottom, and a pair of longitudinal sides extending between the bottom and the top, the stairway section extending upwardly at a slope from the bottom to the top, and the bottom section having caster:
   (b) a stopping mechanism secured to the stairway section;
   (c) a platform connected to the top section of the stairway section;
   (d) a support of adjustable length rotatably secured to and extending downwardly from the platform to support the stairway section in both the folded and the unfolded position;
   (e) at least one spreader extending between the stairway section and the support, the spreader being movable to permit the stairway section and the support to rotate relative to each other to fold and unfold the stairway ladder; and
   (f) at least one handrail secured at a corresponding longitudinal side of the stairway section, the handrail extending outwardly from the stairway section by a predetermined amount so that the handrail can be grasped by a user.

13. The foldable stairway ladder of claim 12, wherein the support can be adjusted to be approximately the same length as the stairway section.

14. The foldable stairway ladder of claim 12, wherein the handrail includes a rail and a pair of arms extending between the rail and the stairway section, the arms being rotatable between a first position corresponding to the handrail when deployed and a second position corresponding to the handrail when collapsed.

15. The foldable stairway ladder of claim 12, wherein the support further comprises an upper section with a first end secured to the platform and a second end opposite the first, wherein the lower section of the support is slidably secured to the upper section and thereby is extendible relative to the second end of the upper section to vary the length of the support.

16. The foldable stairway ladder of claim 15, wherein the lower section support comprises a pair of members and a base, the members having first ends telescopically received within the upper section elongated and second ends secured to the base, the base adapted to engage a horizontal surface to support the platform.

17. The foldable stairway ladder of claim 12, wherein the casters are spring-loaded.

18. The foldable stairway ladder of claim 12, wherein the stairway section is formed substantially of aluminum and the lower section and the spreaders are formed substantially of steel, wherein the lower section is telescopically received within the top section.

19. The foldable stairway ladder of claim 12 further comprising two handrails.

20. The foldable stairway of claim 12, wherein the casters are wheels, rollers or balls.

21. A method of increasing space around a foldable stairway ladder when not in use, the method comprising the steps of:
   (a) providing a stairway section with casters on the lower end and a support deployable relative to the stairway section to hold the stairway section at a desired angle when the foldable stairway ladder is in use, the support and the stairway section being rotatably secured relative to each other;
   (b) extending a section of the support so that the support and stairway section obtain substantially equal lengths;
   (c) unlocking a hinge extending between the support and the stairway section; and
   (d) rotating the stairway section and the support relative to each other to reduce the angle there between to fold the foldable stairway ladder.

22. The method of claim 21, further comprising the step of folding one or more handrails rotatably connected to the stairway section from a deployed position, the deployed position located at a predetermined height above the stairway section, to a folded position, the folded position located at a height below the predetermined height.

23. The method of claim 21, comprising the step of securing the foldable stairway ladder in a substantially vertical position by a holding device.

24. A foldable stairway ladder comprising:
   (a) a stairway section having a bottom section accessible to a user, an upper section at a height above the bottom, and a pair of longitudinal sides extending between the bottom and the top, the stairway section extending upwardly at a slope from the bottom section to the top section, the bottom section having casters;
   (b) a stopping mechanism secured to the stairway section;
   (c) a platform with a first end connected to the top of the stairway section;
   (d) a support rotatably secured to and extending downwardly from the platform at a second end, the support having an upper and a lower section, wherein the lower section, upper section, and platform are configured to retain the stairway section at a slope ranging between about 48 degrees and about 60 degrees, the lower section secured to the upper section to be extendable relative to the upper section, the support and the stairway section having substantially the same length when the lower section is extended;
   (e) a pair of spreaders extending between the stairway section and the upper section, the spreader being movable to permit the stairway section and the upper section to rotate relative to each other to fold and unfold the stairway ladder;
   (f) a pair of handrails secured at to the longitudinal sides of the stairway section, the pair of handrails extending outwardly from the stairway section at a predetermined height so that the handrail can be grasped by a user; and
   (g) an actuable mechanism for folding the handrail relative to the stairway section to reduce the amount the handrail extends from the stairway section.

* * * * *